US009499082B2

(12) United States Patent
Mueller

(10) Patent No.: US 9,499,082 B2
(45) Date of Patent: Nov. 22, 2016

(54) MOTOR VEHICLE

(71) Applicant: Bayerische Motoren Werke Aktiengesellschaft, Munich (DE)

(72) Inventor: Andreas Mueller, Bruckberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/740,338

(22) Filed: Jun. 16, 2015

(65) Prior Publication Data

US 2015/0274051 A1 Oct. 1, 2015

Related U.S. Application Data

(63) Continuation of application No. PCT/EP2013/075942, filed on Dec. 9, 2013.

(30) Foreign Application Priority Data

Dec. 17, 2012 (DE) ......................... 10 2012 223 426

(51) Int. Cl.
| | |
|---|---|
| B60N 2/68 | (2006.01) |
| B60N 2/42 | (2006.01) |
| B60N 2/427 | (2006.01) |
| B60N 2/22 | (2006.01) |

(52) U.S. Cl.
CPC . *B60N 2/68* (2013.01); *B60N 2/22* (2013.01); *B60N 2/4228* (2013.01); *B60N 2/42709* (2013.01)

(58) Field of Classification Search
CPC .......... B60N 2/02; B60N 2/028; B60N 2/20; B60N 2/42; B60N 2/4207; B60N 2/4214; B60N 2/4221; B60N 2/4228; B60N 2/42709; B60N 2/68

USPC ............ 296/65.09, 65.16, 68.1; 297/216.13, 297/216.14
See application file for complete search history.

(56) References Cited

U.S. PATENT DOCUMENTS

| | | | | |
|---|---|---|---|---|
| 8,511,748 | B2 * | 8/2013 | McLeod ................ | B60N 2/686 297/216.1 |
| 8,936,312 | B2 * | 1/2015 | Evans ................... | B60N 2/4228 297/216.13 |

FOREIGN PATENT DOCUMENTS

| | | |
|---|---|---|
| DE | 37 06 394 C1 | 5/1988 |
| DE | 37 14 588 A1 | 11/1988 |
| DE | 3714588 A1 * | 11/1988 ............... B60N 2/68 |

(Continued)

OTHER PUBLICATIONS

English translation of DE 100 47 770; retreived on Mar. 23, 2016 via PatentTranslate at www.epo.org.*
English translation of DE 37 06 394; retreived on Mar. 23, 2016 via PatentTranslate at www.epo.org.*
English translation of JP 5-70344; retreived Mar. 23, 2016 via the Japan Platform for Patent Information located at https://www.j-platpat.inpit.go.jp/web/all/top/BTmTopEnglishPage.*

(Continued)

*Primary Examiner* — Jason S Daniels
(74) *Attorney, Agent, or Firm* — Crowell & Moring LLP

(57) ABSTRACT

Each side bar of a vehicle seat structure has a respective front longitudinal profile and a respective rear longitudinal profile. The front longitudinal profile has a cross-section that enables an elongation of the front longitudinal profile under a tensile stress on the front longitudinal profile. The rear longitudinal profile has a cross-section that enables a compression of the rear longitudinal profile under a bending moment stress on the rear longitudinal profile. The elongation of the front longitudinal profile and the compression of the rear longitudinal profile lead to an absorption of energy.

17 Claims, 2 Drawing Sheets

(56) References Cited

FOREIGN PATENT DOCUMENTS

| | | |
|---|---|---|
| DE | 100 47 770 A1 | 4/2002 |
| DE | 10 2010 019 577 A1 | 11/2011 |
| DE | 20 2011 105 603 U1 | 12/2011 |
| DE | 10 2011 106 219 A1 | 1/2012 |
| JP | 5-70344 U | 9/1993 |
| JP | 5-70345 U | 9/1993 |

OTHER PUBLICATIONS

English translation of DE 37 14 588; retreived on Mar. 23, 2016 via PatentTranslate at www.epo.org.*
German Search Report dated Aug. 6, 2013 with partial English-language translation (ten (10) pages).
International Search Report (PCT/ISA/210) dated Feb. 6, 2014 with English-language translation (six (6) pages).

* cited by examiner

MOTOR VEHICLE

CROSS REFERENCE TO RELATED APPLICATIONS

This application is a continuation of PCT International Application No. PCT/EP2013/075942, filed Dec. 9, 2013, which claims priority under 35 U.S.C. §119 from German Patent Application No. 10 2012 223 426.8, filed Dec. 17, 2012, the entire disclosures of which are herein expressly incorporated by reference.

BACKGROUND AND SUMMARY OF THE INVENTION

The invention relates to a motor vehicle having a vehicle body, having a floor, at least one seat or at least one seat bench being arranged on the floor, wherein the seat has a seat part with a seat surface and a backrest with a backrest surface.

From German Patent document DE 100 47 770 A1, a seat for a motor vehicle is known, where side bars of a frame structure for a backrest of the seat are fastened to two opposite backrest struts.

The two side bars known from German Patent document DE 100 47 770 A1 have a cross-section that tapers in an upward direction. The respective cross-section of the two known side bars is designed corresponding to a load, which is the result of stress caused by a seat user leaning against the backrest and/or in the event of stress caused by a collision.

The tapering shape of the side bars ensures an optimal utilization of material. With respect to their shape and their wall thickness, the known side bars are designed such that bending stress that can be transmitted by way of the backrest height of the seat remains the same.

It is an object of the invention to provide a motor vehicle, in which at least one vehicle seat is arranged such that, while its structure meets the stress-related demands, it simultaneously has a light-weight construction.

This and other objects are achieved by a motor vehicle having a vehicle body, which has a floor, at least one seat or at least one seat bench being arranged on the floor, wherein the seat has a seat part with a seat surface and a backrest with a backrest surface. The seat part is provided with a seat frame. On a rear region of the seat frame, one adjusting mechanism respectively is constructed, which forms a swivel axis about which the backrest can be swiveled. One upward-projecting backrest strut respectively is constructed on both sides of the rear region of the seat frame. A lower end region of a side bar of the seat frame is arranged on the respective backrest strut. Each respective side bar has a front longitudinal profile and a rear longitudinal profile. The front longitudinal profile has a cross-section which permits an elongation of the front longitudinal profile in the event of tensile stress upon the front longitudinal profile. The rear longitudinal profile has a cross-section which permits a compression of the rear longitudinal profile in the event of bending moment stress upon the rear longitudinal profile. The elongation of the front longitudinal profile and the compression of the rear longitudinal profile result in an absorption of energy.

In the case of a motor vehicle according to an embodiment of the invention, a vehicle body has a floor. At least one seat or at least one bench of seats is arranged on the floor. The seat has a seat part with a seat surface and a backrest with a backrest surface. The seat part is equipped with a seat frame. At a rear region of the seat frame, one adjusting mechanism is respectively constructed on each side, which forms a swivel axis, about which the backrest can be swiveled. At the level of the swivel axis, an upwardly extending backrest strut is formed on each side of the rearward region of the seat frame. A lower end region of a side bar is, in each case, arranged on a respective backrest strut. On its lower end region, each respective side bar is designed such that a form-fitting accommodation of the backrest strut is obtained in the mounted condition.

Each side bar advantageously has a respective front longitudinal profile and a respective rear longitudinal profile. The front longitudinal profile has a cross-section that permits an elongation of the front longitudinal profile when the latter is under tensile stress. The rear longitudinal profile has a cross-section which permits a compression of the rear longitudinal profile when the latter is subjected to bending moment stress. The elongation of the front longitudinal profile and the compression of the rear longitudinal profile result in an absorption of energy.

In an advantageous embodiment, the front longitudinal profile is constructed with elevations and indentations. A distance t between two adjacent elevations or indentations amounts to 5 cm≤t≤8 cm, depending on the overall length of the respective side bar.

The cross-section of the front longitudinal profile advantageously has an undulating or wavy course.

In an advantageous embodiment, the rear longitudinal profile forms closed cavities with the front longitudinal profile. The rear longitudinal profile has open gaps between the closed cavities. Under bending stress, the respective gap distance will decrease in the longitudinal direction of the respective side bar between the open gaps, so that a total length of the rear longitudinal profile will decrease in the event of bending moment stress of the respective side bar.

At least one closed cavity is advantageously filled with an energy-absorbing foamed material.

In an advantageous embodiment, at least one open gap is filled with an energy-absorbing foamed material.

The rear longitudinal profile advantageously has a meandering cross-section.

In an advantageous embodiment of the rear longitudinal profile, the meandering cross-section has approximately rectangular sections. The rectangular sections have a mean distance or a mean width in the longitudinal direction of the rear longitudinal profile, which amounts to 3 cm≤b≤6 cm.

The overall length of the respective side bar advantageously is 30 cm≤L≤60 cm.

In an advantageous embodiment, the respective longitudinal profile is a fiber-reinforced composite.

Advantageously, the respective longitudinal profile is a carbon-fiber-reinforced plastic.

In an advantageous embodiment, the respective longitudinal profile is a laminate of organic foils, which is constructed of several individual layers of one thermoplastic foil and unidirectionally extending long fibers, respectively.

Advantageously, the respective longitudinal profile is an organic sheet composite, which consists of fabric-reinforced thermoplastics.

In an advantageous embodiment, the front longitudinal profile and the rear longitudinal profile are each a separate individual component extending in the longitudinal direction of the backrest, before they are assembled. The upper end of the front longitudinal profile and the upper end of the rear longitudinal profile are connected with one another in the assembled state.

Advantageously, the respective side bar is a one-piece component with the front longitudinal profile and the rear longitudinal profile.

In an advantageous embodiment, the two mutually spaced side bars are connected with one another by way of at least one cross member, so that a U-shaped component or an H-shaped component is obtained.

The energy-absorbing foamed material advantageously is expanded polypropylene (EPP).

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
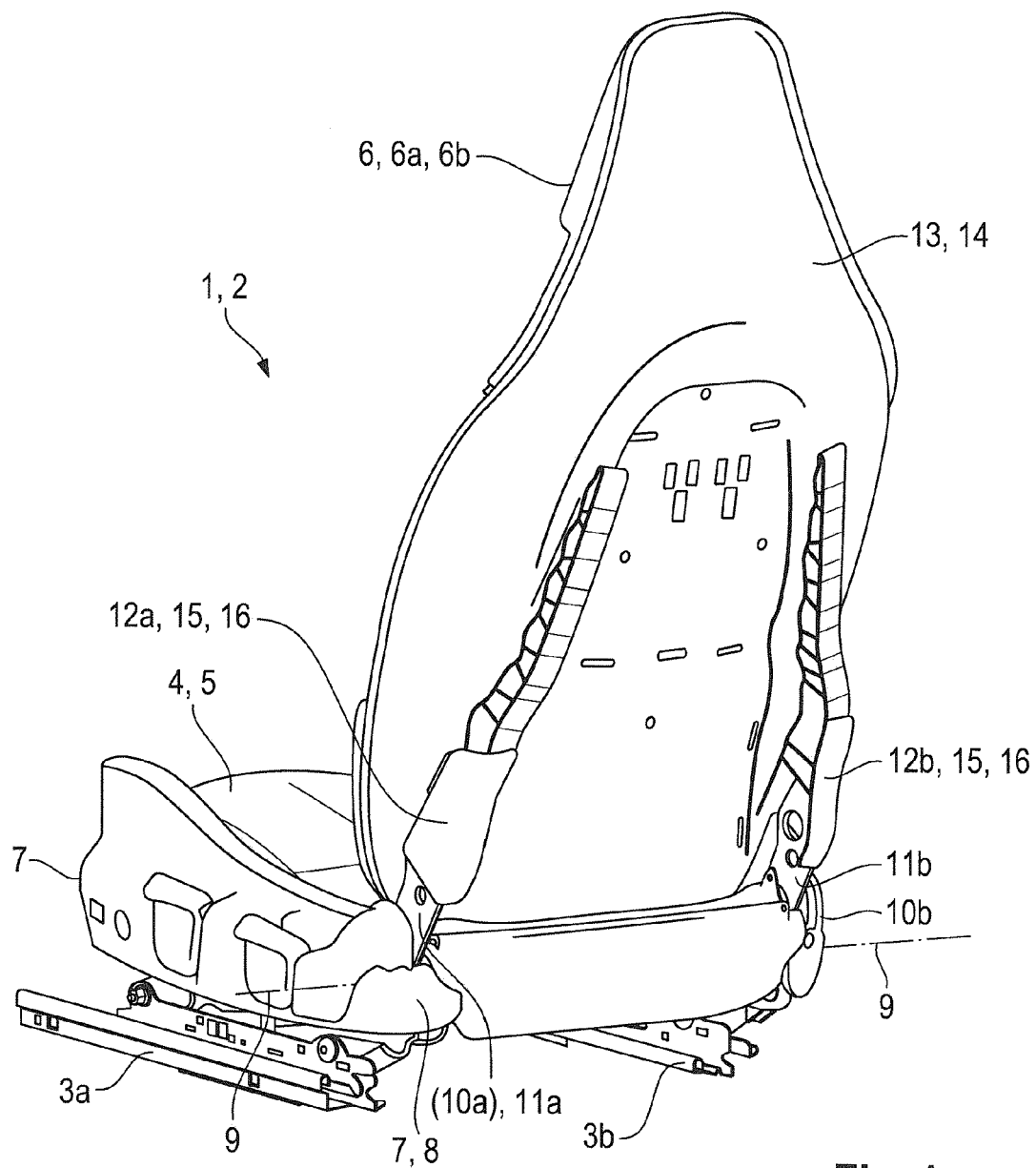
FIG. 1 is a perspective view of a backside of a backrest of a vehicle seat, in which an outer paneling of the backrest was omitted, so that two side bars or longitudinal supports of the backrest become visible.

FIG. 1 illustrates an individual seat 2 which is fastened by way of two mutually spaced guide rails 3a, 3b to a floor of a body of a motor vehicle 1, which floor is not shown in detail. The seat 2 has a seat part 4 with a seat surface 5 and a backrest 6.

The seat part 4 has a seat frame 7 with a rear region 8, on which a swiveling axis 9 is formed by way of fittings or adjusting mechanisms 10 arranged on both sides. One backrest strut 11a and 11b is arranged on each adjusting mechanism 10a, 10b. One side bar 12a and 12b is arranged on each backrest strut 11a and 11b.

The respective side bars 12a and 12b are arranged on an outer surface 13 of a backrest shell 14, which outer surface faces toward the rear in the direction of a backseat bench or of a backseat, (not shown). Upholstery 6b is provided on the backrest shell 14 toward the outer surface 6a of the backrest 6 facing toward the front. In an embodiment that is not shown, the two side bars 12a and 12b are mutually connected by way of a cross member, as known from German Patent document DE 100 47 770 A1.

Figure 2:
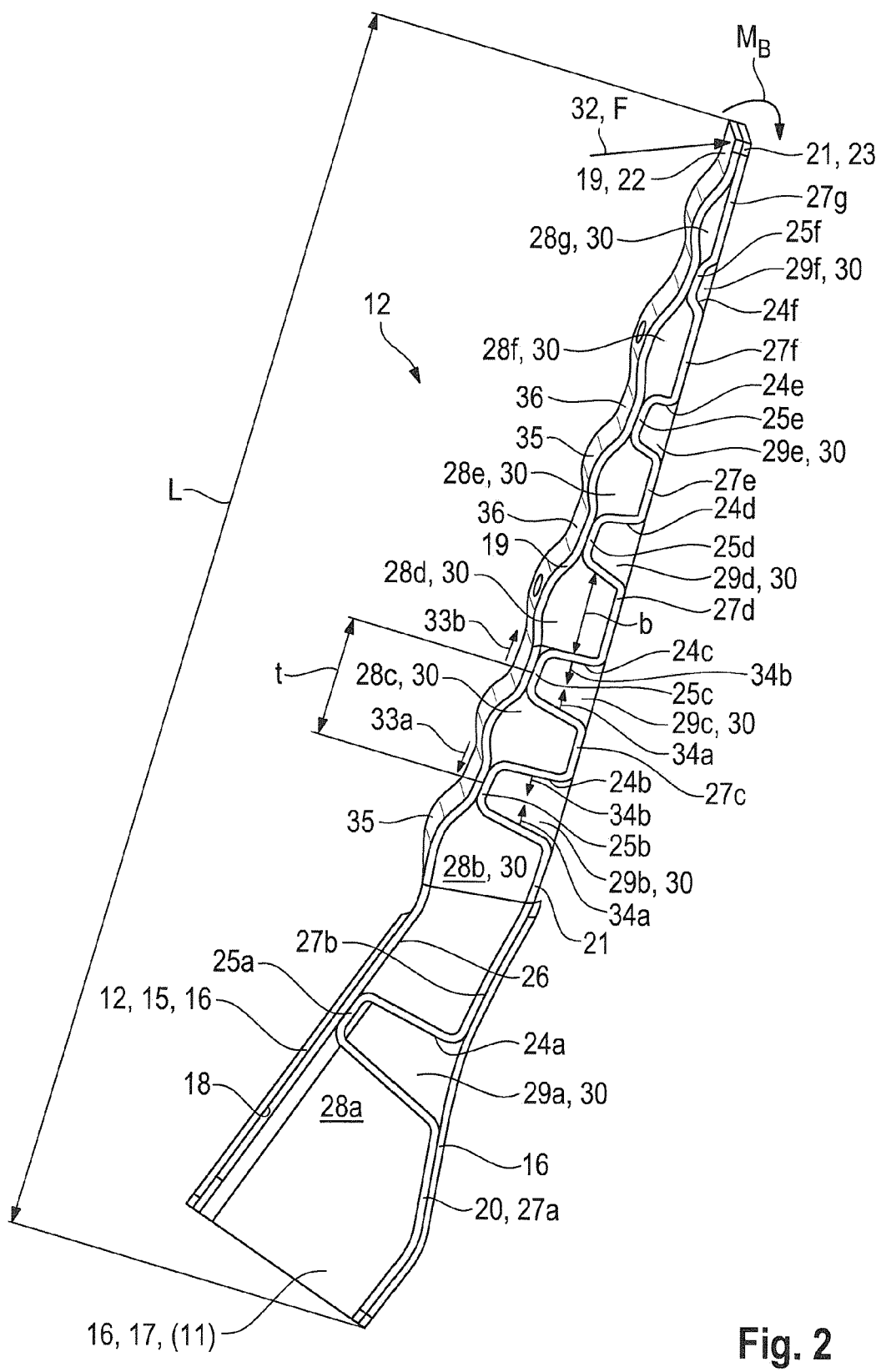
FIG. 2 is a longitudinal sectional view of a side bar or longitudinal support of the backrest illustrated in FIG. 1.

FIG. 2 illustrates that a fastening section 16 is constructed on a lower region 15 of a respective side bar 12 for arranging a respective backrest strut 11. The fastening section 16 has a cavity 17, in which the backrest strut 11 is inserted and fastened. Each respective side bar 12 has two opposite longitudinal sections 19 and 21 respectively, which extend along the entire length of the side bar 12 into the fastening section 16.

In the illustrated embodiment, the fastening section 16 of the side bar 12 surrounds a lower end 18 of the front longitudinal section 19. A lower end 20 of the rear longitudinal section 21 is fastened opposite thereto. The two longitudinal sections 19, 21 are connected with one another at respective upper ends 22, 23 of the front longitudinal section 19 and of the rear longitudinal section 21.

In the illustrated embodiment, the front longitudinal section 19 has an undulating course, as illustrated in FIG. 2. The undulating course of the front longitudinal profile 19 has elevations 35 and depressions 36. A distance between two adjacent elevations 35 or depressions 36 amounts to 5 cm≤t≤8 cm, depending on the total length L of the respective side bar 12a, 12b.

The rear longitudinal section 21 has a meandering cross-section. Rectangular sections 24a to 24f are formed in the illustrated embodiment of the meandering cross-section of the rear longitudinal section 21.

The sections 25a to 25f of the rectangular sections 24a to 24f of the rear longitudinal section 21, which extend in the longitudinal direction of the side bar 12, rest against an inner surface 26 of the front longitudinal section 19 or are spaced at short distance t with respect to the inner surface 26 of the front longitudinal section 19. The distance amounts to t≤3 mm±2 mm.

The rectangular sections 24a to 24f of the rear longitudinal section 21 are followed by rear longitudinal sections 27a to 27g. The rectangular sections 24a to 24f of the rear longitudinal section 21 are mutually connected by the rear longitudinal sections 27a to 27g. This mode of construction results in cavities 28a to 28g between the front longitudinal section 19 and the rear longitudinal section 21.

Outside the lower fastening section 16 of the side bar 12, gaps 29a to 29f, which gaps are open toward the rear, are formed at the rear longitudinal section 21.

In one embodiment, the open gaps 29a to 29f are filled with an energy-absorbing foamed material 30, such as EPP. In one embodiment, the closed cavities 28b to 28g are also filled with an energy absorbing foamed material 30.

In the event of stress upon the backrest 6 and therefore on the respective side bar 12a and 12b with a force F and a bending moment $M_B = F \circ L$ resulting from a multiplication with the lever arm L, an energy reduction is obtained by an elongation of the undulating profile of the front longitudinal section 19 and by a compression of the respective foamed material in the spaces 29a to 29f.

In the event of stress upon the respective side bar 12a and 12b corresponding to the arrow 32, tensile stress corresponding to arrows 33a and 33b takes place at the front undulating longitudinal profile 19 and therefore leads to an elongation of the front longitudinal profile 19.

Since the rear longitudinal profile 21 is shortened in the event of the stress corresponding to arrow 32, the energy absorbing foamed material 30 situated in the gaps 29a to 29f is simultaneously compressed corresponding to the arrows 34a and 34b. Energy is reduced as a result of the compression of the energy-absorbing foamed material 30.

In an embodiment, the two longitudinal profiles 19 and 21 are produced of a fiber-reinforced composite. The fiber-reinforced composite may be a carbon-fiber-reinforced plastic material.

In another embodiment, the longitudinal profiles 19, 21 consist of fabric-reinforced thermoplastics.

In a further embodiment, the longitudinal support profiles 19 and 21 are produced of a thermoplastic material.

In a further embodiment, the longitudinal profiles 19 and 21 consist of an organic sheet. The organic sheet is a fiber-reinforced composite material, which is produced of a thermoplastic synthetic foil and unidirectionally extending long fibers. The fiber length may be approximately 60 mm. A laminate is produced from the organic sheet, which consists of several individual layers. Corresponding to a previously calculated course of force, the individual layers are placed upon one another with different orientations and are then connected with one another.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle having a floor and at least one seat having a seat part and a backrest, the seat being arranged on the floor, comprising:
a seat frame of the seat part, a swivel axis about which the backrest is swivelable being formed in a rear region of the seat frame;
one upwardly-projecting backrest strut respectively arranged on each side of the rear region of the seat frame;
one side bar respectively arranged, at a lower end region thereof, on each backrest strut, wherein
each sidebar comprises a front longitudinal profile and a rear longitudinal profile,
the front longitudinal profile has a cross-section configured with elevations and depressions along a longitudinal extent thereof to permit an elongation of the front longitudinal profile in an event of tensile stress upon the front longitudinal profile,
the rear longitudinal profile has a meandering cross-section having approximately rectangular sections along the longitudinal extent thereof to permit a compression of the rear longitudinal profile in an event of a bending moment stress upon the rear longitudinal profile,
the rectangular sections define open gaps facing away from the front longitudinal profile and, sections of the rectangular sections that rest against or are spaced at a short distance from an inner surface of the front longitudinal profile define closed cavities between the open gaps, and
the elongation of the front longitudinal profile and the compression of the rear longitudinal profile are configured to provide energy absorption.

2. The motor vehicle according to claim 1, wherein:
a median distance (t) between two adjacent elevations or depressions is 5 cm≤t≤8 cm dependent upon a total length (L) of the sidebar.

3. The motor vehicle according to claim 2, wherein the front longitudinal profile has an undulating cross-section course.

4. The motor vehicle according to claim 1, wherein:
in an event of the bending moment stress, a respective distance between the open gaps is reduced in the longitudinal direction of the sidebar so that a total length (L) of the rear longitudinal profile is reduced in the event of the bending moment stress on the sidebar.

5. The motor vehicle according to claim 4, wherein at least one of the closed cavities is filled with an energy-absorbing foamed material.

6. The motor vehicle according to claim 5, wherein at least one of the open gaps is filled with an energy-absorbing foamed material.

7. The motor vehicle according to claim 6, wherein the energy-absorbing foamed material is expanded polypropylene.

8. The motor vehicle according to claim 5, wherein the energy-absorbing foamed material is expanded polypropylene.

9. The motor vehicle according to claim 1, wherein:
the rectangular sections have a median distance or a median width (b) in the longitudinal direction of the rear longitudinal profile of between 3 cm≤b≤6 cm.

10. The motor vehicle according to claim 1, wherein a total length (L) of the side bar is 30 cm≤L≤60 cm.

11. The motor vehicle according to claim 1, wherein one or both of the front and rear longitudinal profiles is formed of a fiber-reinforced composite material.

12. The motor vehicle according to claim 1, wherein one or both of the front and rear longitudinal profiles is formed of a carbon-fiber reinforced plastic material.

13. The motor vehicle according to claim 1, wherein the side bar is formed in one-piece with the front and rear longitudinal profiles.

14. The motor vehicle according to claim 1, further comprising:
at least one cross member connecting the two respectively spaced side bars, the cross member and side bars being configured to have a U or H shape configuration.

15. A motor vehicle having a floor and at least one seat having a seat part and a backrest, the seat being arranged on the floor, comprising:
a seat frame of the seat part, a swivel axis about which the backrest is swivelable being formed in a rear region of the seat frame;
one upwardly-projecting backrest strut respectively arranged on each side of the rear region of the seat frame;
one side bar respectively arranged, at a lower end region thereof, on each backrest strut, wherein
each sidebar comprises a front longitudinal profile and a rear longitudinal profile,
the front longitudinal profile has a cross-section configured to permit an elongation of the front longitudinal profile in an event of tensile stress upon the front longitudinal profile,
the rear longitudinal profile has a cross-section permitting a compression of the rear longitudinal profile in an event of a bending moment stress upon the rear longitudinal profile,
the elongation of the front longitudinal profile and the compression of the rear longitudinal profile are configured to provide energy absorption, and
at least one or both of the front and rear longitudinal profiles is formed of a laminate of organic foils, each of which is constructed of several individual layers of one thermoplastic synthetic foil and unidirectionally extending long fibers.

16. A motor vehicle having a floor and at least one seat having a seat part and a backrest, the seat being arranged on the floor, comprising:
a seat frame of the seat part, a swivel axis about which the backrest is swivelable being formed in a rear region of the seat frame;
one upwardly-projecting backrest strut respectively arranged on each side of the rear region of the seat frame;
one side bar respectively arranged, at a lower end region thereof, on each backrest strut, wherein
each sidebar comprises a front longitudinal profile and a rear longitudinal profile,
the front longitudinal profile has a cross-section configured to permit an elongation of the front longitudinal profile in an event of tensile stress upon the front longitudinal profile,
the rear longitudinal profile has a cross-section permitting a compression of the rear longitudinal profile in an event of a bending moment stress upon the rear longitudinal profile, the elongation of the front longitudinal profile and the compression of the rear longitudinal profile are configured to provide energy absorption, and one or both of the front and rear longitudinal profiles is formed of an organic sheet comprising fiber-reinforced thermoplastics.

17. A motor vehicle having a floor and at least one seat having a seat part and a backrest, the seat being arranged on the floor, comprising:

- a seat frame of the seat part, a swivel axis about which the backrest is swivelable being formed in a rear region of the seat frame;
- one upwardly-projecting backrest strut respectively arranged on each side of the rear region of the seat frame;
- one side bar respectively arranged, at a lower end region thereof, on each backrest strut, wherein
- each sidebar comprises a front longitudinal profile and a rear longitudinal profile,
- the front longitudinal profile has a cross-section configured to permit an elongation of the front longitudinal profile in an event of tensile stress upon the front longitudinal profile,
- the rear longitudinal profile has a cross-section permitting a compression of the rear longitudinal profile in an event of a bending moment stress upon the rear longitudinal profile,
- the elongation of the front longitudinal profile and the compression of the rear longitudinal profile are configured to provide energy absorption, and
- the front and rear longitudinal profiles are individually separate components configured to extend in the longitudinal direction of the backrest, upper ends of the front and rear longitudinal profiles being mutually connected.

* * * * *